United States Patent [19]
Pappas et al.

[11] Patent Number: 5,478,154
[45] Date of Patent: Dec. 26, 1995

[54] QUASI-CONDUCTIVE ANTI-INCENDIARY FLEXIBLE INTERMEDIATE BULK CONTAINER

[75] Inventors: Robert J. Pappas, Mt. Pleasant; George M. Milner, Summerville, both of S.C.; Vahid Ebadat, Lawrenceville, N.J.

[73] Assignee: Linq Industrial Fabrics, Inc., Summerville, S.C.

[21] Appl. No.: 252,660

[22] Filed: Jun. 1, 1994

[51] Int. Cl.⁶ .............................. B65D 30/04; D02G 3/00
[52] U.S. Cl. ..................... 383/117; 383/105; 383/113; 383/116; 428/288; 428/373
[58] Field of Search ..................... 383/67, 113, 117, 383/116, 105; 428/288, 373, 374, 368, 397

[56] References Cited

U.S. PATENT DOCUMENTS

| | | |
|---|---|---|
| 3,407,928 | 10/1969 | Schwartz . |
| 3,678,675 | 7/1972 | Klein . |
| 4,207,376 | 6/1980 | Nagayasu et al. . |
| 4,207,937 | 6/1980 | Sandeman et al. . |
| 4,362,199 | 12/1982 | Futerman . |
| 4,431,316 | 2/1984 | Massey . |
| 4,643,119 | 2/1987 | Langston et al. . |
| 4,833,008 | 5/1989 | Derby . |
| 4,900,495 | 2/1990 | Lin . |
| 4,921,751 | 5/1990 | Wakahara et al. . |
| 4,989,995 | 2/1991 | Rubenstein et al. . |
| 4,997,712 | 3/1991 | Lin . |
| 5,071,699 | 12/1991 | Pappas et al. . |
| 5,092,683 | 3/1992 | Wurr . |
| 5,202,185 | 4/1993 | Samuelson . |
| 5,213,865 | 5/1993 | Yamada . |
| 5,244,281 | 9/1993 | Williamson et al. . |
| 5,260,013 | 11/1993 | Samuelson . |

FOREIGN PATENT DOCUMENTS

| | | |
|---|---|---|
| 637129 | 8/1990 | Australia . |
| 1143673 | 3/1983 | Canada . |
| 2023643 | 2/1991 | Canada . |

OTHER PUBLICATIONS

Anti Static Mechanisms Associated with FIBC Fabrics Containing Conductive Fibres, M. A. Nelson et al., 1993 No Month.
Nega–Stat the New Standard in Static Dissipative Fibers, DuPont No Date.
Electronics, packaging spur developments in antistats, Plastics World 3/89.
Static Hazards Using Flexible Intermediate Bulk Containers for Powder Handling, Laurence G. Britton, Oct. 1993.
Understanding and Controlling Static Electricity, Gunter Luttgens, Martin Glor. . No Date.
A Study of the incendivity of electrical discharges between planar resistive electrodes, G. J. Butterworth, E. S. Paul and J. N. Chubb, Culham Laboratory, Abingdon, Oxon, U.K. No date.

*Primary Examiner*—Allan N. Shoap
*Assistant Examiner*—Jes F. Pascua
*Attorney, Agent, or Firm*—Dickstein, Shapiro & Morin

[57] ABSTRACT

A quasi-conductive woven fabric section including quasi-conductive fibers, which reduce the potential for incendiary discharge. The woven fabric section may further include an antistatic coating. The coating may be applied to an entire surface of the woven fabric section or it may coat about one-half of the section. A process is disclosed for making flexible fabric containers with a reduced potential for incendiary discharge made of woven fabric sections including the quasi-conductive fibers. In addition, a process is disclosed for making such containers with a reduced potential for incendiary discharge including an antistatic coating on the containers, either over the entire surface or over approximately half of the surface.

10 Claims, 4 Drawing Sheets

QUASI-CONDUCTIVE ANTI-INCENDIARY FLEXIBLE INTERMEDIATE BULK CONTAINER

BACKGROUND OF THE INVENTION

The present invention is directed at decreasing the potential for incendiary discharges caused by electrostatic charges that can accumulate on flexible containers. More particularly the present invention is directed toward decreasing the potential for incendiary discharges caused by electrostatic charges in flexible containers such as flexible intermediate bulk containers.

It has been found that the shifting of specific materials within containers made of woven fabrics, as well as particle separation between the materials and such containers during loading and unloading of the container cause triboelectrification and create an accumulation of static electricity on the container walls. In addition, the accumulation of static electricity is greater at lower relative humidity and increases as the relative humidity drops. Also, highly charged material entering such containers can create an accumulation of static electricity on the container walls. Electrostatic discharges from a charged container can be incendiary, i.e. cause combustion in dusty atmospheres or in flammable vapor atmospheres. Moreover, discharges can be quite uncomfortable to workers handling such containers.

One conventional approach to solving this problem is to use a grounded container. Such a container may include conductive fibers that are electrically connected to ground to carry the electric energy out of the bag. The use of a grounded container, however, works only as long as the container remains grounded. If the container becomes ungrounded, its ability to decrease the potential for an incendiary discharge is lost, and due to the higher capacitance of the conductive system, the discharge can be much more energetic and incendiary than conventional non-conductive containers. Additionally, fabrication of the conductive containers requires specialized construction techniques to ensure all conductive surfaces are electrically connected together for a ground source.

Another conventional approach to decreasing the potential for incendiary discharges in flexible containers has been directed toward decreasing the surface electrostatic field of the container. If the magnitude of the electrostatic field on the surface of a container is above a certain threshold level, the potential for an incendiary discharge due to the electrostatic charge exists. That threshold level is about 500 kilovolts per meter (kV/m) for intermediate bulk containers made from woven polypropylene fabric. By decreasing the surface electrostatic field below about 500 kV/m, the potential for an incendiary discharge is greatly decreased and believed to be rendered virtually non-existent. Attempts at reducing the surface electrostatic field level below about 500 kV/m have not, however, proven successful without proper grounding.

One such effort at decreasing surface electrostatic fields has focused on the creation of corona discharges. There are four basic types of electrostatic discharges: spark discharges; brush discharges; propagating brush discharges; and, corona discharges. Of the four electrostatic discharges, the spark, the brush and the propagating brush electrostatic discharges can all create incendiary discharges. The corona discharge is not known to create incendiary discharges for common flammable atmospheres.

By incorporating certain materials into the flexible fabric container, as the electrostatic field increases, corona discharges from such materials limit the maximum field. This electrostatic field level, however, is above the 500 kV/m threshold level at which the potential for incendiary discharge first appears. Examples of this conventional approach include U.S. Pat. No. 4,207,376 (Nagayasu), U.S. Pat. No. 4,989,995 (Rubenstein), U.S. Pat. No. 4,900,495 (Lin), U.S. Pat. No. 4,997,712 (Lin), U.S. Pat. No. 5,116,681 (Lin) and U.S. Pat. No. 5,147,704 (Lin).

Yet another approach to the problem of incendiary discharge has been to decrease the surface resistivity of a container by coating the container with an antistatic material. Such a coating on the container surface increases the threshold level of the potential for an incendiary discharge to about 1500 kV/m. However, the potential for an incendiary discharge is still a very real possibility. Examples of this approach include U.S. Pat. No. 5,151,321 (Reeves), U.S. Pat. No. 5,092,683 (Wurr) and U.S. patent application Ser. No. 08/139,113, which is incorporated herein by reference in its entirety.

SUMMARY OF THE INVENTION

The present invention alleviates the deficiencies of the prior art to a great extent by creating a quasi-conductive woven fabric section including quasi-conductive fibers. As an additional step, an antistatic coating can be applied to the woven fabric section. A coating with a specific surface resistivity range, for example an antistatic coating, can be applied so that it covers the entire surface, or it can be applied so that it covers a portion of the surface.

The present invention further discloses a process for making flexible containers with a reduced potential for incendiary discharge made of woven fabric sections including the quasi-conductive fibers. In addition, a process is disclosed for making such flexible containers with a reduced potential for incendiary discharge that includes an antistatic coating on the containers, either over the entire surface or over a portion of the surface. By leaving a portion of the surface uncoated, the product packaged within the flexible containers can "breath," which is required in certain applications, such as in the transportation of talc or kaolin clay. While the coating of a portion of the surface can be applied in any pattern, applying the coating in strips allows for greater manufacturing efficiency. Furthermore, the strips can be either in the warp or the weft direction.

A primary object of the present invention is to disclose a woven fabric section with a reduced potential for incendiary discharge. That reduced potential for incendiary discharge is created through the use of quasi-conductive fibers or through a combination of quasi-conductive fibers and an antistatic coating.

A second object of the present invention is to disclose a flexible fabric container with a reduced potential for incendiary discharge using quasi-conductive fibers or a combination of quasi-conductive fibers and an antistatic coating.

BRIEF DESCRIPTION OF THE DRAWINGS

A fuller understanding of the invention may be had by referring to the following description and claims taken in conjunction with the accompanying drawings, wherein:

DETAILED DESCRIPTION OF PREFERRED EMBODIMENTS

Figure 1:
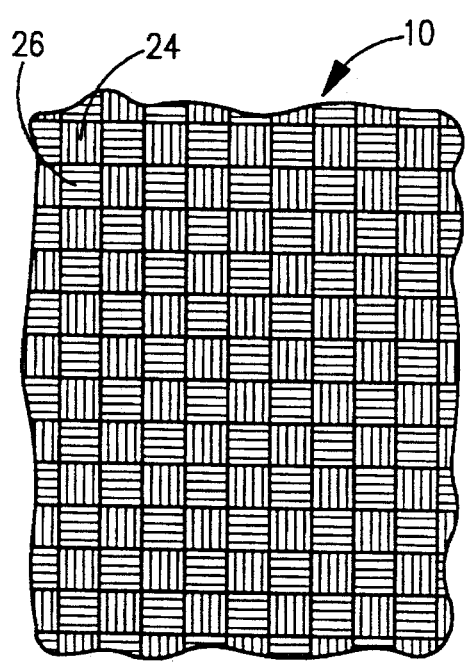
FIG. 1 is a partial view of a woven fabric section including fibers in the warp and weft directions.

Referring now to the drawings, where like reference numerals indicate like elements, there is shown in FIG. 1a woven fabric section 10 including vertically extending warp fibers 24 interwoven with horizontally extending weft or filling fibers 26. These yarns are interwoven by techniques well known in the art on a textile loom to form a sheet-like material relatively free of interstices. The tightness of the weave depends on the end use. Where the fabric is to be used to form containers for holding large particle size bulk material such as tobacco or pellets, then a fairly open weave of mono or multifilament yarn may be used in a count range of from about 1000 to 3000 denier in each weave direction.

The yarns may be composed of a tight weave of axially oriented polypropylene flat tape material having a preferred thickness of from about 0.5 to about 2 mils and a preferred width of from about 50 to about 250 mils, It will be appreciated that by use of the flat tape yarns, maximum coverage is obtained with the least amount of weaving since it requires relatively few flat yarns per inch to cover a given surface as compared to yarns circular cross section. It is important that the ribbon-like yarns be highly oriented mono-axially in the longitudinal direction or biaxially in the longitudinal and transverse directions. This is accomplished by so drawing the flat yarn or the web from which flat yarn ribbons are slit, so as to irreversibly stretch the yarn or web, thereby orienting the molecular structure of the material. In biaxially oriented yarns or sheeting, the material is hot or cold-stretched both in the transverse and longitudinal directions, but for purposes of the present invention, it is desirable that the orientation be carried out mainly in the longitudinal direction.

When axially oriented polypropylene yarns are interwoven, they cross over in the warp and weft directions, and because of their high tear and tensile strength, as well as their hydrophilic properties, the resultant fabric is highly stable. Thus the bag, if properly seamed, is capable of supporting unusually heavy loads without sagging or stretching of the walls of the bag.

Figure 2:
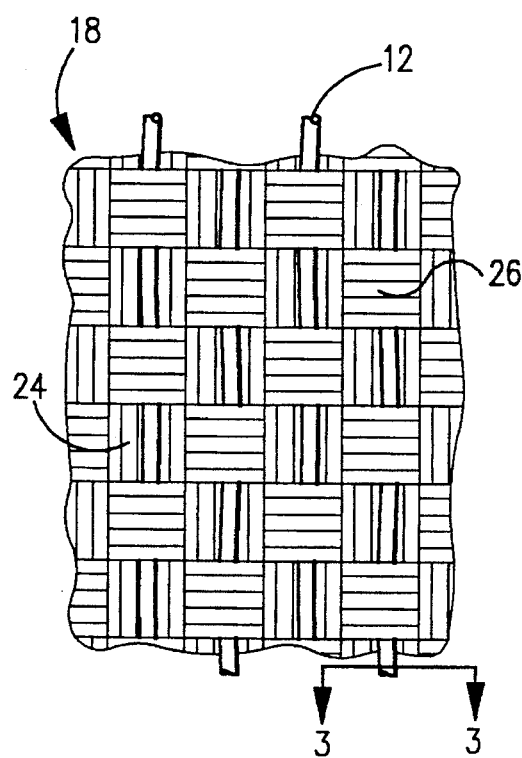
FIG. 2 is a partial view of a woven fabric section including quasi-conductive fibers woven in the warp direction.

Shown in FIG. 2 is a quasi-conductive fabric section 18 that includes the warp fibers 24, the weft fibers 26 and quasi-conductive fibers 12, which are woven with and in parallel to some of the warp fibers 24. While the quasi-conductive fibers 12 are shown parallel to the warp fibers 24, they could be positioned parallel to the weft fibers 26. The quasi-conductive fibers 12 may be spaced about one to about four inches apart. Furthermore, while the quasi-conductive fibers 12 are shown in FIG. 2 in a standard over one—under one pattern, the fibers 12 can be woven in any pattern.

A quasi-conductive fabric conducts sufficiently to effect corona discharge, but not in a manner sufficient to substantially effect incendiary discharges. One embodiment of a quasi-conductive fabric may include quasi-conductive fibers. A quasi-conductive fiber effects corona discharge, such as at its ends or at other discharge points, but has sufficient resistance to substantially avoid incendiary discharge at its ends or along its length at a rate that results in incendiary type discharges. One embodiment of a quasi-conductive fiber may include a relatively conductive core, at least partially ensheathed in a relatively quasi-conductive or non-conductive material. Other configurations could include a fiber having a substantially homogeneous material or a relatively more heterogeneous mixture of materials with larger regions of different materials relative to the fiber 12 diameter. Additionally, the fiber 12 could include more than one sheath-type layer.

Figure 3:
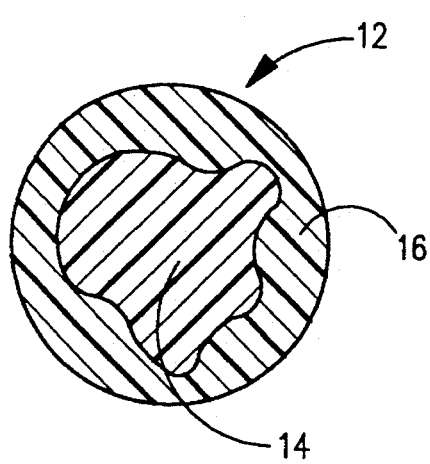
FIG. 3 is a cross-sectional view of the quasi-conductive fiber of FIG. 2, taken along line 3—3.

Conductive materials that may result in incendiary discharges have a surface resistivity on the order of $10^5$ ohms per square ($\Omega/\square$) and below. Non-conductive materials generally have a surface resistivity on the order of $10^{12}$ to $10^{13}$ ohms per square ($\Omega/\square$) and above. Antistatic coating materials, which are an example of coatings of materials with a specific surface resistivity range used in described embodiments of the present invention, have a surface resistivity on the order of $10^9$ to $10^{12}$ ohms per square ($\Omega/\square$). Insulating sheath material, as is used in one embodiment of the quasi-conductive fiber, may have an electrical resistivity per length on the order of $10^8$ ohms per meter. FIG. 3 is a cross-sectional view of the quasi-conductive fiber 12 taken along line 3—3 of FIG. 2. The quasi-conductive fiber 12 contains a relatively conductive portion 14 and a quasi-conductive outer sheath portion 16. The conductive core 14 may take other shapes, and thus the present invention is not limited to the conductive core shape depicted in FIG. 3. The quasi-conductive fiber 12 is one embodiment of quasi-conductive fibers. Other embodiments may not include distinct conductive cores with quasi-conductive sheaths. One currently available fiber that may be adapted to be used as a quasi-conductive fiber, like the embodiment of fiber 12, is a P-70 fiber created by DuPont.

Figure 4:
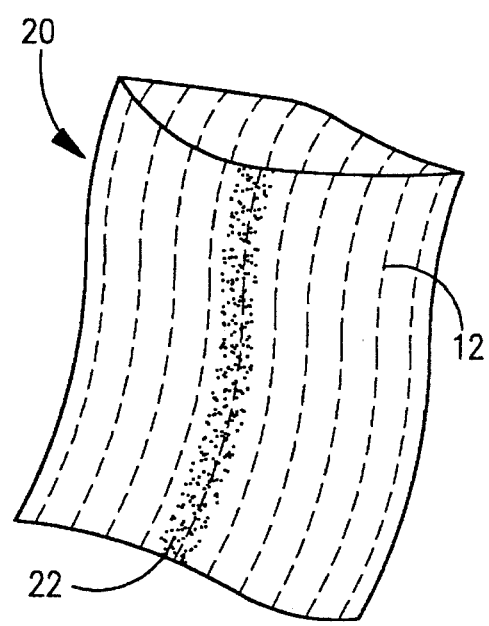
FIG. 4 is a side view of a woven flexible fabric container including quasi-conductive fibers and further including a strip-of an antistatic coating.

As an electrostatic field builds up on the flexible container 20 including quasi-conductive fibers 12 (as shown in FIG. 4), a localized zero potential charge is created at some midline between the quasi-conductive fibers 12. This causes a potential to be created between that midline and the quasi-conductive fibers 12, causing ions to migrate into the quasi-conductive fibers 12.

The quasi-conductive fibers 12 have a resistivity that prevents an incendiary discharge from occurring from the fiber surface. This is due to the insulating sheath 16 surrounding the conductive core 14. The electric energy instead travels down the length of the quasi-conductive fiber cores 14 and exits the ends of the quasi-conductive fibers 12 as a corona discharge. The P-70 fiber exhibited a corona discharge threshold voltage at its ends in the range of about three to about four kilovolts. Further, the fiber, when formed into a loop exhibited a corona discharge threshold voltage at its loop end of about nine kilovolts. If conductive yarns are used, the capacitance of the system is increased and a large charge of energy may develop. If a ground approaches the ascribed conductive system, an energetic discharge may occur at such a level as to be incendiary. We have found the above-mentioned DuPont quasi-conductive fibers have a corona discharge threshold voltage in the range of about three to four kilovolts at their fiber ends. Furthermore, when an end of such fibers is looped, a corona discharge threshold voltage (the "looped-end corona discharge threshold voltage") of about nine kilovolts is observed.

Quasi-conductive fibers 12 can be used in flexible intermediate bulk containers 20 either by themselves or in conjunction with an antistatic coating 22 (as shown in FIG. 4). Container 20, as shown in FIG. 4, includes side walls and two ends. Flexible intermediate bulk containers are used to transport finely divided solids such as cement, fertilizer, salt, sugar and barite as well as virtually any type of finely divided solids. An antistatic coating 22 may be applied to cover the entire surface of the flexible fabric container 20 or a portion of the surface as depicted in FIG. 4. While the coating 22 shown in FIG. 4 is substantially parallel to fibers 12, the coating 22 may be applied substantially perpendicular to fibers 12.

Antistatic coatings are laminates or coverings of thermoplastic or other materials, such as paper, over fabrics or fabric components that disperse potential localized energetic static charges over the surface and allow for controlled discharge of the charges. This combination increases the electrostatic charge level at which an incendiary discharge may occur. For example, such antistatic thermoplastic-type coatings may be imparted by the inclusion of a minor amount of a polyol ester of a $C_{10}$ to $C_{28}$ monocarboxylic acid.

In addition, a mixture of such acids may be included in a thermoplastic coating (not shown), which is primarily for sealing interstices in the yarn weave to prevent leakage of any finely divided contents of containers. Optionally, a mixture of such acids may be included within both the thermoplastic coating and the polypropylene, mixed during each formulation. Suitable polyols from which these esters may be derived include ethylene glycol, propylene glycol, glycerol, pentaerythritol and like materials. Preferred esters include mixtures of mono-, di-, and triglycerides (glycerol esters) of $C_{10}$ to $C_{28}$ monocarboxylic acids such as decanoic, lauric, myristic, palmitic or stearic acids, as well as mixtures of such esters. The most preferred esters are esters of $C_{10}$ to $C_{22}$ monocarboxylic acids, and are most preferably stearyl monoglycerides containing at least about 80% by weight of the glycerol monostearate monoester. A preferred group of anti-static compounds are polyol partial fatty acid esters marketed by the Henkel Company under the trade designation DEHYDAT 8312 and DEHYDAT 8316.

In general, good antistatic properties may be obtained by the inclusion of from about 1.0% to about 15% by weight of the antistatic agent into the coating formulation, based on the weight of polymer in the coating. More preferred levels of antistatic compound are around 6% actual by weight.

The antistatic compound may also be incorporated into the polypropylene composition used to prepare the yarn material and at levels of from 0 to about 2% by weight based on the content of polypropylene polymer. The preferred content of antistatic compound when present in the yarn material ranges from about 0.05 to about 1% by weight, with about 0.1 to about 0.8% by weight being most preferred.

The antistatic additive may be mixed with the base polymer in the molten state or with polymer pellets in an extruder. Preferably the antistatic compound is first formulated into a concentrate also containing an olefin polymer such as polyethylene or polypropylene and any other ingredients to be added such as a UV-absorber, plasticizer, filler, dye or the like, and this concentrate is then thoroughly admixed with the base polymer.

Figure 5:
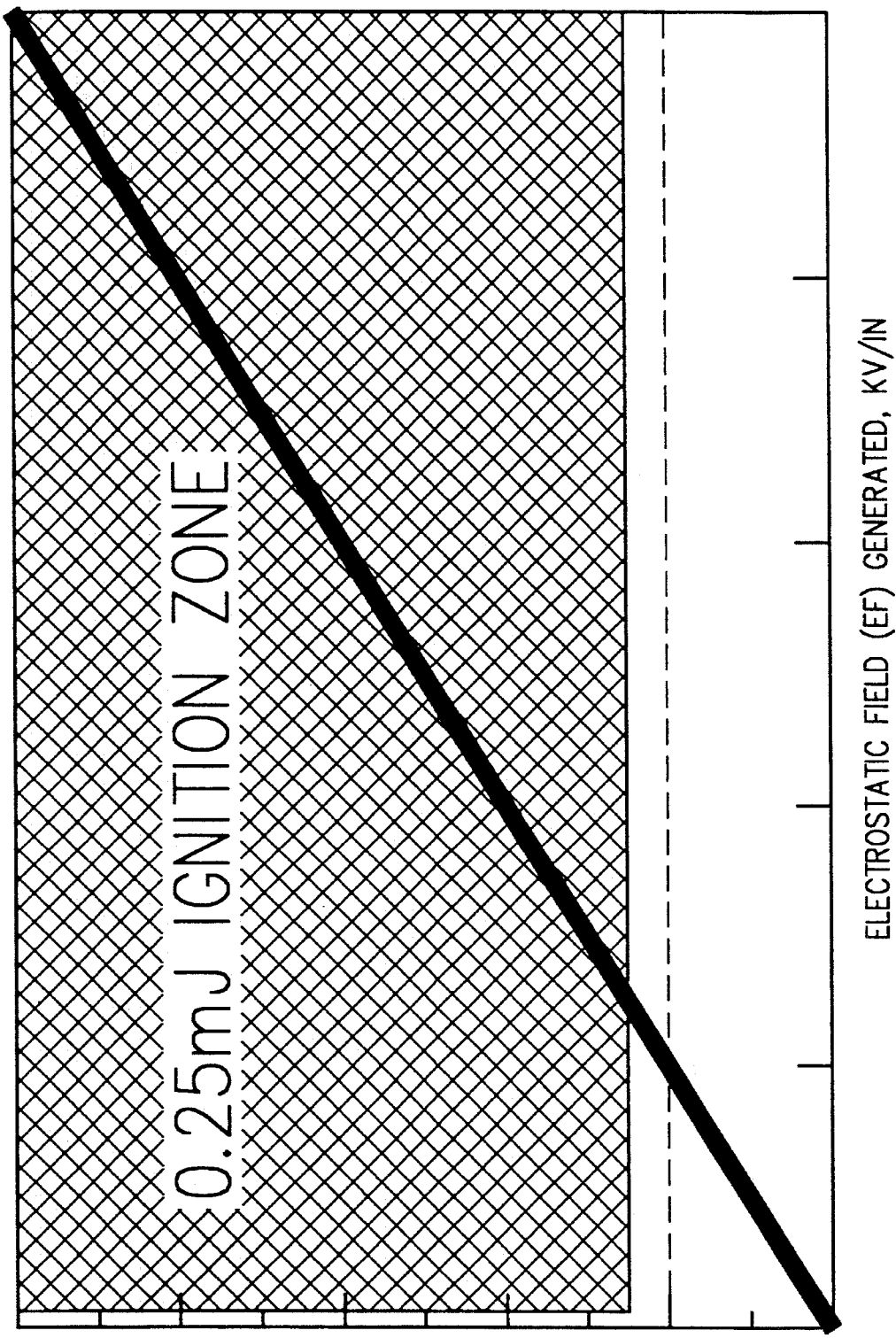
FIG. 5 is a graph depicting the potential for incendiary discharge on a conventional flexible intermediate bulk container.
Figure 6:
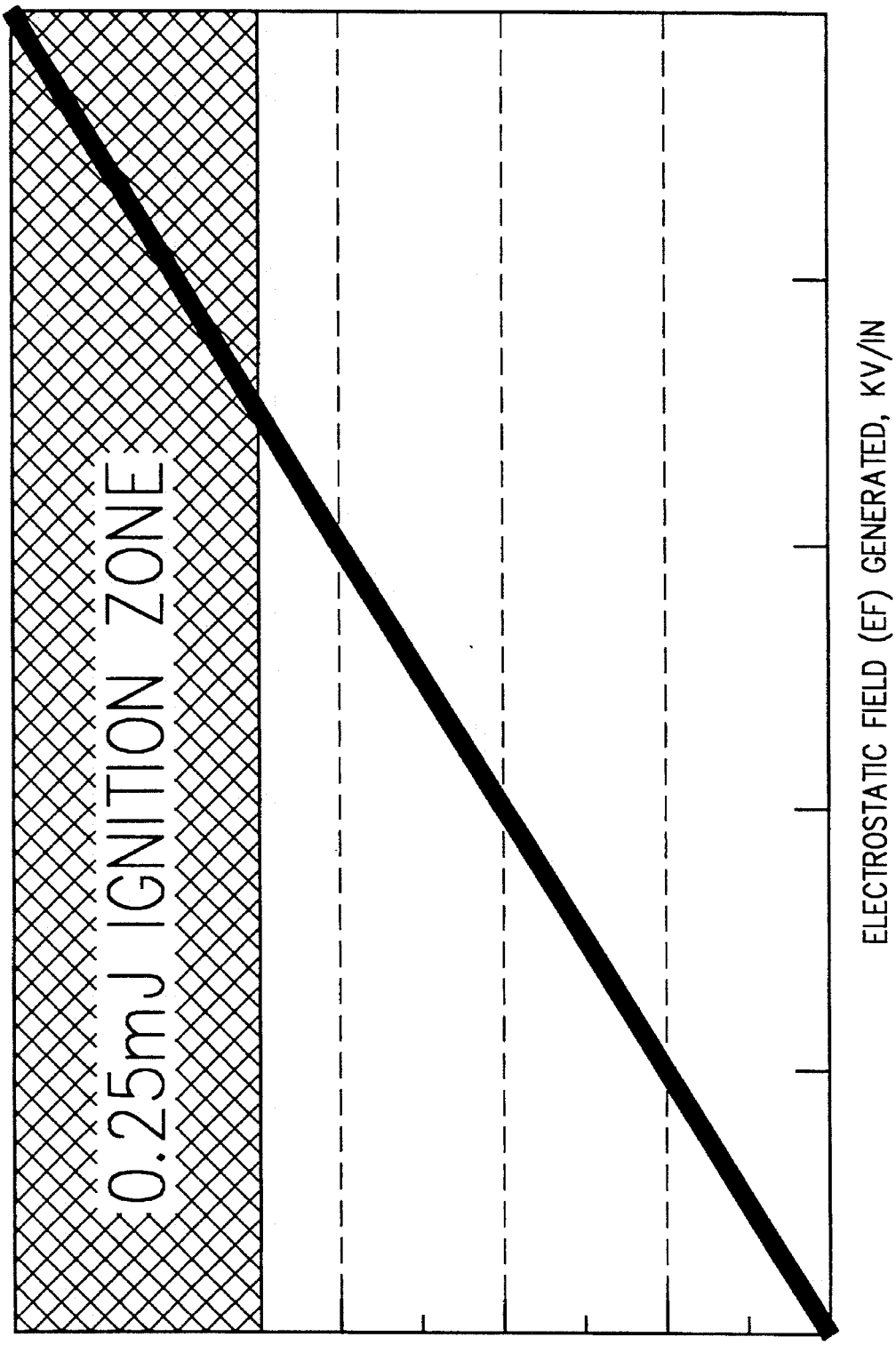
FIG. 6 is a graph depicting the potential for incendiary discharge on a flexible intermediate bulk container which has antistatic coating; and, FIG. 7 is a graph depicting the potential for incendiary discharge on a flexible intermediate bulk container includes quasi-conductive fibers and which has antistatic coating.
Figure 7:
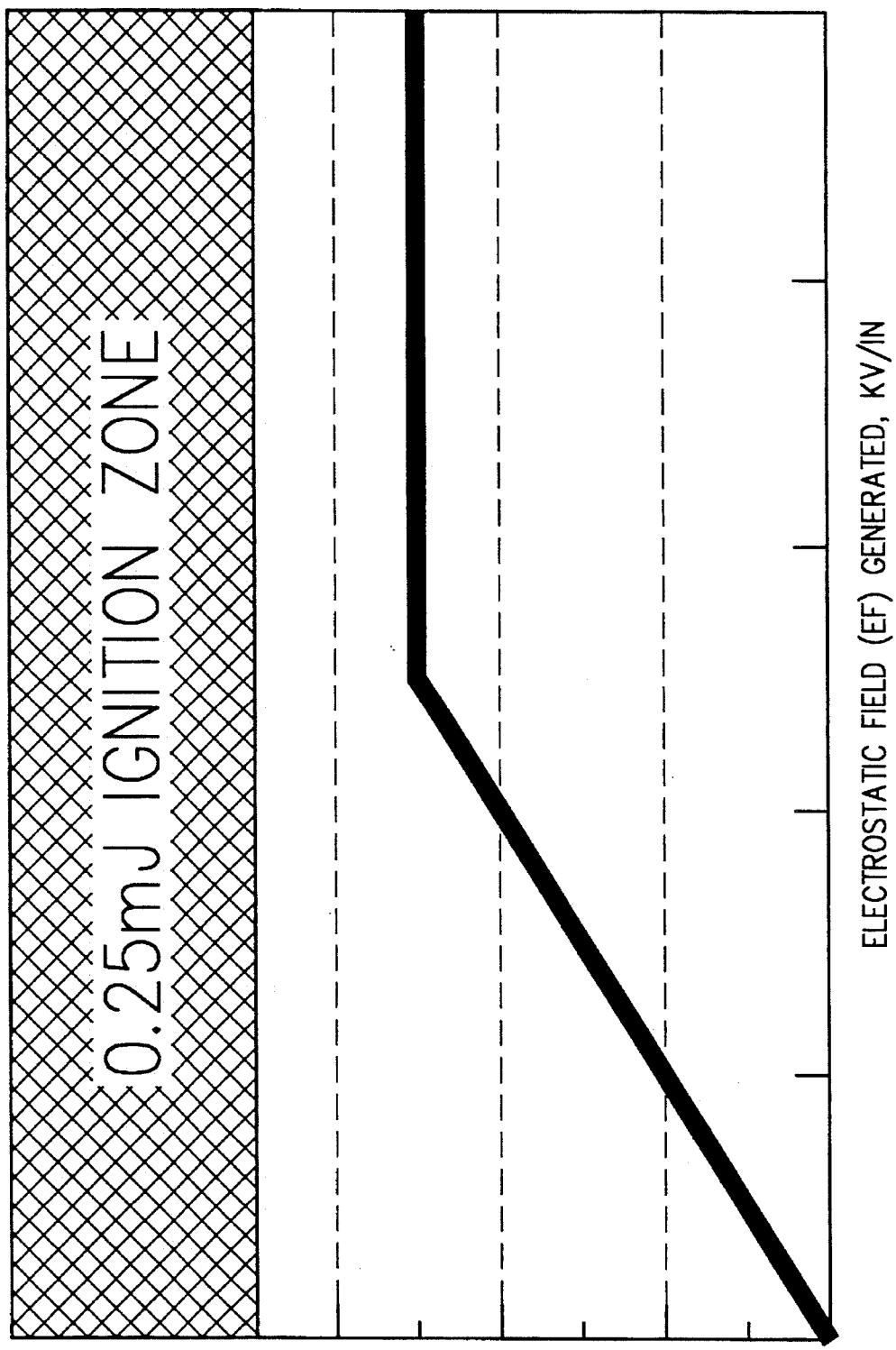

Antistatic coatings 22 cause the threshold level for the potential for an incendiary charge to be increased. With reference to FIGS. 5–7, the utility of antistatic coatings 22 is shown. FIG. 5 depicts the ignition profile of a flexible fabric container that does not have an antistatic coating 22 or quasi-conductive fibers 12. As shown in FIG. 5, the threshold level at which an incendiary charge can occur is at about 500 kilovolts per meter. With reference to FIG. 6, an ignition profile is depicted for a flexible fabric container with an antistatic coating 22 applied over the entire surface of the container. As can be seen in FIG. 6, the threshold ignition level has been raised to about 1500 kilovolts per meter. Tests have further shown that a flexible fabric container that is coated with an antistatic coating 22 covering approximately one-half of the container in strips has its ignition threshold raised above the level exhibited by uncoated flexible fabric containers.

FIG. 7 depicts the ignition profile of the flexible container 20 including the antistatic coating 22 and the quasi-conductive fibers 12. As is apparent from FIG. 7, the ignition zone threshold is higher than the electrostatic field that can accumulate on the surface of the flexible fabric container 20. The result is that the flexible fabric container 20 including the quasi-conductive fibers 12 has a threshold electrostatic field on the surface of the container 20 that is no greater than approximately 900 kV/m. This is well below the ignition zone profile of about 1500 kV/m caused by the use of the antistatic coating 22. The result of a threshold electrostatic field on the container 20 being below the ignition zone profile of the coating 22 occurs whether the coating 22 covers the entire surface of container 20 or only about one-half of the surface. In this way, the potential for incendiary discharge in flexible containers is significantly decreased.

While the present invention has been described in relation to its use in flexible fabric containers, there are other applications envisioned. Examples of other applications include use in pneumatic conveyor tubes or gravity slides or as liners in other containment vessels that transport products in situations where triboelectric charging may take place.

What is new and desired to be protected by Letters Patent of the United States is:

We claim:

1. An ungrounded type flexible fabric container with a reduced potential for incendiary discharge for use in a combustible environment comprising:

a woven fabric configured to form the flexible fabric container having side walls;

a coating of a compound having antistatic properties applied to cover a surface of said walls; and said coated fabric including a plurality of quasi-conductive fibers having corona discharge points, said fibers being composed of a plurality of filaments, said filaments sized and shaped to effect: corona discharge at said discharge points and to have resistance to avoid incendiary discharge at ends of said filaments and along the lengths of said filaments at a rate that results in incendiary type discharges in the combustible environment.

2. An ungrounded type flexible fabric container according to claim 1, wherein said quasi-conductive fibers are woven into the fabric container.

3. An ungrounded type flexible fabric container according to claim 2, wherein said quasi-conductive fibers are positioned about one to about four inches apart from one another.

4. An ungrounded type flexible fabric container according to claim 1, wherein said filaments include a conductive core and an insulating sheath.

5. An ungrounded type flexible fabric container according to claim 1, wherein said filaments are sized and shaped to have a corona discharge threshold voltage at said ends of said filaments in the range of about three to about four kilovolts and said filaments having a looped-end corona discharge threshold voltage of about nine kilovolts.

6. An ungrounded type flexible fabric container according to claim 1, wherein the fabric container is a flexible intermediate bulk container.

7. An ungrounded type flexible fabric container with a reduced potential for incendiary discharge for use in a combustible environment comprising:

a woven fabric configured to form the flexible fabric container having side walls; and said woven fabric including at least one quasi-conductive fiber positioned up to about four inches apart from one another and having corona discharge points, said fibers being composed of one or more filaments, said filaments sized and shaped to effect corona discharge at said discharge points and to have resistance to avoid incendiary discharge at ends of said filaments and along the lengths of said filaments at a rate that results in incendiary type discharges in the combustible environment.

8. An ungrounded type flexible fabric container according to claim 7, wherein said quasi-conductive fibers include a conductive core and an relatively insulating sheath.

9. An ungrounded type flexible fabric container according to claim 7, wherein said filaments are sized and shaped to have a corona discharge threshold voltage at said ends of said filaments in the range of about three to about four kilovolts and said filaments having a looped-end corona discharge threshold voltage of about nine kilovolts.

10. An ungrounded type flexible fabric container according to claim 7, wherein said container is a flexible intermediate bulk container.

* * * * *

(12) EX PARTE REEXAMINATION CERTIFICATE (5955th)
United States Patent
Pappas et al.

(10) Number: US 5,478,154 C1
(45) Certificate Issued: Oct. 23, 2007

(54) QUASI-CONDUCTIVE ANTI-INCENDIARY FLEXIBLE INTERMEDIATE BULK CONTAINER

(75) Inventors: Robert J. Pappas, Mt. Pleasant, SC (US); George M. Milner, Summerville, SC (US); Vahid Ebadat, Lawrenceville, NJ (US)

(73) Assignee: Linq Industrial Fabrics, Inc., Summerville, SC (US)

Reexamination Request:
No. 90/008,003, Apr. 13, 2006

Reexamination Certificate for:
Patent No.: 5,478,154
Issued: Dec. 26, 1995
Appl. No.: 08/252,660
Filed: Jun. 1, 1994

(51) Int. Cl.
*B65D 30/04* (2006.01)
*D02G 3/00* (2006.01)

(52) U.S. Cl. ............... 383/117; 383/105; 383/113; 383/116; 428/373; 442/200; 442/301

(58) Field of Classification Search ............ None
See application file for complete search history.

(56) References Cited

U.S. PATENT DOCUMENTS

| | | |
|---|---|---|
| 4,431,316 A | 2/1984 | Massey |
| 5,071,699 A | 12/1991 | Pappas et al. |
| 5,202,185 A | 4/1993 | Samuelson |
| 5,679,449 A | 10/1997 | Ebadat et al. |
| 6,112,772 A | 9/2000 | Ebadet et al. |
| 6,451,407 B1 | 9/2002 | Nickell |

OTHER PUBLICATIONS

"Anti Static Mechanisms Associated with FIBC Fabrics Containing Conductive Fibres," M.A. Nelson et el., Journal of Electrostatics, vol. 30 proceedings of the pages presented at the Seventh Intl. Conference on Electrostatics, May 11–13, 1993, Elsevier Science Publishers, B.V. (1993).

"The Electrostatic Spark Discharging Behaviour of Some Flexible, Intermediate Bulk Containers", Dr. N. Wilson, Sep. 28, 1989, IBC Technical Services, Ltd.

"Static Hazards Using Flexible Intermediate Bulk Containers for Powder Handling", Lawrence G. Britton, Process Safety Progress, vol. 1, No. 4, Oct. 1993, pp. 240–250.

Untangling the Terminnology of Statis Dissapation,: Plastics World, Mar. 1989, p. 46.

"Static Electricity and FIBCs," Exxon publication BBS–1191, and "Baxon Blue," Exxon publication BBP–1191–A, Oct. 1, 1991.

Nega–Stat the New Standard in Static Dissapative Fibers, Dupont, pp. 2–18, facsimile date of Feb. 28, 1994.

Declaration of Mr. Mike Dyer executed Apr. 13, 2004.

Patent Assignment Abstract of Title for the '154 patent, cited under MPEP Section 2124.

"A Brief History of Crohmiq," Linq Industrial Fabrics, Inc. web page at http://www.crohmiq.com/about/chrohist,html cited under MPEP Section 2124.

(Continued)

*Primary Examiner*—Bibhu Mohanty

(57) ABSTRACT

A quasi-conductive woven fabric section including quasi-conductive fibers, which reduce the potential for incendiary discharge. The woven fabric section may further include an antistatic coating. The coating may be applied to an entire surface of the woven fabric section or it may coat about one-half of the section. A process is disclosed for making flexible fabric containers with a reduced potential for incendiary discharge made of woven fabric sections including the quasi-conductive fibers. In addition, a process is disclosed for making such containers with a reduced potential for incendiary discharge including an antistatic coating on the containers, either over the entire surface or over approximately half of the surface.

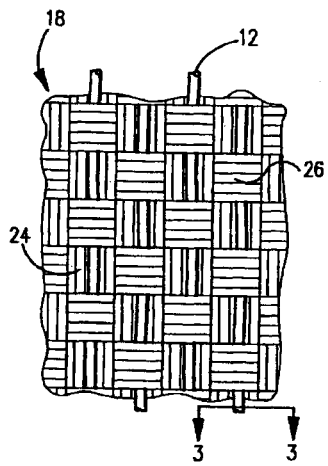

OTHER PUBLICATIONS

"Static Protective FIBC Fabric is FCA Compliant" press release dated Jul. 1, 2004 at http://news.thomasnet.com/printready.html?prid=453424 cited under MPEP Section 2124.

Patent Assignment Abstract of Title for U.S. Patent 5,202,285, which is cited under MPEP Section 2124.

Nega Stat by Barnet, Barnet webpage on Nega–Stat at http://www.barnet.com/html/nega_stat.html.

"Electrostatic Hazards in the Use of Flexible Intermediate Bulk Containers," V. Ebadat et al., Presented at the Hazards XI, Institution of Chemical Engineering Symposium, Manchester, United Kingdom (Apr. 1991). Hazards XI: New Directions in Process Safety, Institution of Chemical Engineers Symposium Series No. 124, 1991: pp. 105–117.

"Static Electricity and FIBC's" Linq Industrial Fabrics, Inc. literature with product data sheets dated Dec. 1, 1992.

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–10 is confirmed.

* * * * *

(12) EX PARTE REEXAMINATION CERTIFICATE (6164th)
United States Patent
Pappas et al.

(10) Number: US 5,478,154 C2
(45) Certificate Issued: Mar. 25, 2008

(54) QUASI-CONDUCTIVE ANTI-INCENDIARY FLEXIBLE INTERMEDIATE BULK CONTAINER

(75) Inventors: Robert J. Pappas, Mt. Pleasant, SC (US); George M. Milner, Summerville, SC (US); Vahid Ebadat, Lawrenceville, NJ (US)

(73) Assignee: Texene LLC, Summerville, SC (US)

Reexamination Request:
No. 90/008,467, Feb. 2, 2007

Reexamination Certificate for:
Patent No.: 5,478,154
Issued: Dec. 26, 1995
Appl. No.: 08/252,660
Filed: Jun. 1, 1994

Reexamination Certificate C1 5,478,154 issued Oct. 23, 2007

(51) Int. Cl.
*B65D 30/04* (2006.01)
*D02G 3/00* (2006.01)

(52) U.S. Cl. .................. 383/117; 383/105; 383/113; 383/116; 428/373; 442/200; 442/301

(58) Field of Classification Search .................. None
See application file for complete search history.

(56) References Cited

U.S. PATENT DOCUMENTS

| | | |
|---|---|---|
| 4,431,316 A | 2/1984 | Massey |
| 5,071,699 A | 12/1991 | Pappas et al. |
| 5,202,185 A | 4/1993 | Samuelson |
| 5,512,355 A | 4/1996 | Fuson |
| 5,679,449 A | 10/1997 | Ebadat et al. |
| 6,112,772 A | 9/2000 | Ebadat et al. |
| 6,451,407 B1 | 9/2002 | Nickell |

OTHER PUBLICATIONS

Nega Stat by Barnet, Barnet webpage on Nega–Stat at http://www.barnet.com/html/nega_stat.html.
"A brief history of Chrohmiq," Linq Industrial Fabrics, Inc. web page at http://www.crohmiq.com/about/crohist.html.
Patent Assignment Abstract of Title for the '154 patent.
Patent Assignment Abstract of Title for U.S. Patent 5,202,185.
"Static Protective FIBC Fabric is FCA Compliant" press release dated Jul. 1, 2004 at http://news.thomasnet.com/printready.html?prid=453424.
"Anti Static Mechanisms Associated with FIBC Fabrics Containing Conductive Fibres," M.A. Nelson et al., Journal of Electrostatics, vol. 30 proceedings of the pages presented at the Seventh Intl. Conference on Electrostatics, May 11–13, 1993, Elsevier Science Publishers, B.V. (1993).
"The Electrostatic Spark Discharging Behaviour of Some Flexible, Intermediate Bulk Containers", Dr. N. Wilson, Sep. 28, 1989, IBC Technical Services, Ltd.

(Continued)

*Primary Examiner*—Bibhu Mohanty

(57) ABSTRACT

A quasi-conductive woven fabric section including quasi-conductive fibers, which reduce the potential for incendiary discharge. The woven fabric section may further include an antistatic coating. The coating may be applied to an entire surface of the woven fabric section or it may coat about one-half of the section. A process is disclosed for making flexible fabric containers with a reduced potential for incendiary discharge made of woven fabric sections including the quasi-conductive fibers. In addition, a process is disclosed for making such containers with a reduced potential for incendiary discharge including an antistatic coating on the containers, either over the entire surface or over approximately half of the surface.

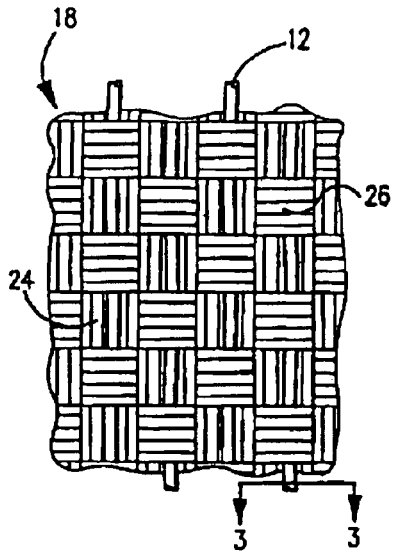

OTHER PUBLICATIONS

"Static Electricity and FIBCs, " Exxon, publication BBS–1191, and "Baxon Blue," Exxon publication BBP–1191–A, Oct. 1, 1991.

"Static Electricity and FIBC's" Linq Industrial Fabrics, Inc. literature with product data sheets dated Dec. 1, 1992.

"The Effectiveness of Static Dissipative Fibers and Fabrics," DuPont NEGA–STAT® Marketing Video, Copyright 1993 (submitted herein in CD–R (SVCD) format and transcript).

Nega–Stat the New Standard in Static Dissapative Fibers, Dupont, pp. 2–18, facsimile date of Feb. 28, 1994.

"Electrostatic Hazards in the Use of Flexible Intermediate Bulk Containers," V. Ebadat et al., Presented at the Hazards XI, Institution of Chemical Engineering Symposium, Manchester, United Kingdom (Apr. 1991). Hazards XI: New Directions in Process Safety, Institution of Chemical Engineers Symposium Series No. 124, 1991: pp. 105–117.

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–10 is confirmed.

* * * * *

(12) EX PARTE REEXAMINATION CERTIFICATE (7176th)
United States Patent
Pappas et al.

(10) Number: US 5,478,154 C3
(45) Certificate Issued: Nov. 17, 2009

(54) QUASI-CONDUCTIVE ANTI-INCENDIARY FLEXIBLE INTERMEDIATE BULK CONTAINER

(75) Inventors: Robert J. Pappas, Mt. Pleasant, SC (US); George M. Milner, Summerville, SC (US); Vahid Ebadat, Lawrenceville, NJ (US)

(73) Assignee: Texene LLC, Summerville, SC (US)

Reexamination Request:
No. 90/008,986, Jan. 8, 2008

Reexamination Certificate for:
Patent No.: 5,478,154
Issued: Dec. 26, 1995
Appl. No.: 08/252,660
Filed: Jun. 1, 1994

Reexamination Certificate C1 5,478,154 issued Oct. 23, 2007

Reexamination Certificate C2 5,478,154 issued Mar. 25, 2008

(51) Int. Cl.
| | | |
|---|---|---|
| *B32B 23/10* | (2006.01) | |
| *B32B 23/00* | (2006.01) | |
| *B65D 88/16* | (2006.01) | |
| *B65D 88/00* | (2006.01) | |
| *D06M 15/227* | (2006.01) | |
| *D06M 17/04* | (2006.01) | |
| *D06M 17/00* | (2006.01) | |
| *D06M 13/00* | (2006.01) | |
| *D06M 15/21* | (2006.01) | |
| *D06M 13/224* | (2006.01) | |
| *D06N 3/04* | (2006.01) | |
| *D06N 3/00* | (2006.01) | |

(52) U.S. Cl. .................. 383/117; 428/373; 383/105; 383/113; 383/116; 442/200; 442/301

(58) Field of Classification Search .................. None
See application file for complete search history.

(56) References Cited

U.S. PATENT DOCUMENTS

| | | |
|---|---|---|
| 3,803,453 A | 4/1974 | Hull |
| 3,963,803 A | 6/1976 | Tanaka et al. |
| 3,969,559 A | 7/1976 | Boe |
| 4,129,677 A | 12/1978 | Boe |
| 4,207,376 A | 6/1980 | Nagayasu et al. |
| 4,303,733 A | 12/1981 | Bulle et al. |
| 4,357,390 A | 11/1982 | Ozaki et al. |
| 4,604,320 A | 8/1986 | Okamoto et al. |
| 4,666,764 A | 5/1987 | Kobayashi et al. |
| 4,756,969 A | 7/1988 | Takeda |
| 4,807,299 A | 2/1989 | Nattrass et al. |
| 4,931,598 A | 6/1990 | Calhoun et al. |
| 4,997,712 A | 3/1991 | Lin |
| 5,019,445 A | 5/1991 | Sternlieb |
| 5,071,699 A | 12/1991 | Pappas et al. |
| 5,092,683 A | 3/1992 | Wurr |
| 5,202,185 A | 4/1993 | Samuelson |
| 5,277,855 A | 1/1994 | Blackmon et al. |
| 5,518,812 A | 5/1996 | Mitchnick et al. |
| 5,679,449 A | 10/1997 | Ebadat et al. |

(Continued)

OTHER PUBLICATIONS

Luttgens, "Static Electricity Hazards in the use of Flexible Intermediate Bulk Containers (FIBC's)," IEEE Transactions on Industry Applications, vol. 33, No. 2, Mar./Apr. 1997, pp. 444–446.*

(Continued)

*Primary Examiner*—Alan Diamond

(57) ABSTRACT

A quasi-conductive woven fabric section including quasi-conductive fibers, which reduce the potential for incendiary discharge. The woven fabric section may further include an antistatic coating. The coating may be applied to an entire surface of the woven fabric section or it may coat about one-half of the section. A process is disclosed for making flexible fabric containers with a reduced potential for incendiary discharge made of woven fabric sections including the quasi-conductive fibers. In addition, a process is disclosed for making such containers with a reduced potential for incendiary discharge including an antistatic coating on the containers, either over the entire surface or over approximately half of the surface.

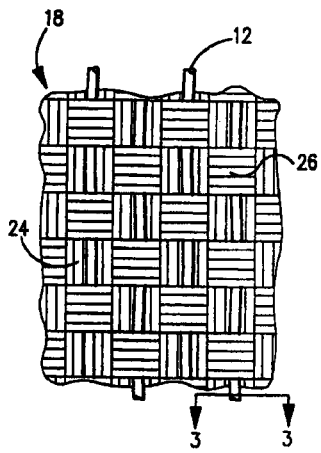

U.S. PATENT DOCUMENTS 6,112,772 A     9/2000    Ebadat et al.
6,503,959 B1    1/2003    Nishiyama et al.

OTHER PUBLICATIONS

J.N. Chubb, The Control of Static Electricity, Electrostatics Summer School '85, University College of North Wales, Bangor, Sep. 1985.

Laurence G. Britton, "Static Hazards Using Flexible Intermediate Bulk Containers for Powder Handling," *Process Safety Progress* (vol. 12, No. 4), pp. 240–250, Oct. 1993.

Gunter Luttgens, Martin Glor, "Understanding and Controlling Static Electricity," Ehningen bel Boblingen: expert–Vert., 1989, ISBN 3–8169–0510–2.

Ian Davidson, "Selecting and using bulk bags—Part I," *Powder and Bulk Engineering*, pp. 33–38, CSC Publishing, Aug. 1989.

British Standards Institution, "Code of practice for Control of undesirable static electricity. Part 1. General considerations," BS 5958 : Part 1 : 1991, Global Engineering Documents.

British Standards Institution, "Code of practice for Control of undesirable static electricity. Part 2. Recommendations for particular industrial situations," BS 5958 : Part 2: 1991, Global Engineering Documents.

P. Cartwright, Sampuran Singh, D.G.L., Thorpe, "Study of Electrostatic Hazards Associated with the Use of Intermediate Bulk Containers," IEEE, pp. 1384–1390, 1986.

Exxon Chemical, "Intermediate Bulk Container Fabrics: Baxon Blue," Polymers Group, BBP–1191–A, Oct. 1991.

E. Wurr, "Electrostatic Charge Dissipation of FIBCS Permanent and Reliable," *Powder Handling & Processing*, vol. 4, No. 1, Mar. 1992.

G. Luttgens, "Dangers of Electrostatic Ignition When Using Flexible Bulk Containers," *Powder Handling & Processing*, vol. 4, No. 1, Mar. 1992.

M. Glor, "Discharges and hazards associated with the handling of powders," Inst. Phys. Conf. Ser. No. 85: Section 3, pp. 207–216, Paper presented at Electrostatics '87, Oxford, IOP Publishing Ltd. 1987.

Laurence G. Britton, "Static Hazards Using Flexible Intermediate Bulk Containers for Powder Handling," Central Research and Engineering Technology Department, Chemical Engineering Technology Section, Union Carbide corporation, 1993.

C. James Dahn, A. Kashani, B. Reyes, "Flexible Intermediate Bulk Container (FIBC) Potential Electrostatic Hazards," Safety Consulting Engineers, Inc., Schaumburg, IL, no date.

Reinhard E. Bruderer, "Use Bulk Bags," *Chemical Engineering Progress*, pp. 28–31, May 1993.

B. Maurer, M. Glor, G. Luttgens, L. Post, "Hazards associated with propagating brush discharges on flexible intermediate bulk containers, compounds and coated materials," Inst. Phys. Conf. Ser. No. 85: Section 3, pp. 217–222, Paper presented at Electrostatics '87, Oxford, IOP Publishing Ltd. 1987.

M. Glor, "Ignition of Gas/Air Mixtures by Discharges Between Electrostatically Charged Plastic Surfaces and Metallic Electrodes," *Journal of Electrostatics*, 10 (1981), pp. 327–332, Elsevier Scientific Publishing Company 1981.

MA Nelson, Dr RL Rogers, "Electrostatic problems with Flexible Intermediate Bulk Containers," Paper presented at IBC European Seminar on Electrostatic Hazards in Industry, Nov. 1991.

The Packaging Institute USA, "FIBC performance standards," *Powder and Bulk Engineering*, p. 32, May 1988.

Union Carbide Corporation Testing and Research Service, "Vacuum Aluminized Flexible Intermediate Bulk Bags Electrical and Barrier Properties," Job No. 85112501, Testing Service Performed for: B.A.G. Corporation, Nov. 25, 1985.

M. Glor, B. Maurer, R. Rogers, "Recent Developments in the Assessment of Electrostatic Hazards Associated with Powder Handling," *Loss Prevention and Safety Promotion in the Process Industries*, vol. 1, pp. 219–230, Elsevier Science B.V. 1995.

SR Beattie, "Antistatic Mechanisms Associated with FIBC Containing Conductive Threads," Zeneca Fine Chemicals Manufacturing Organisation, Manchester, U.K., no date.

Dr. P. Cartwright, "Electrostatic Hazards in the Use of Flexible Intermediate Bulk Containers (FIBC's)," Chilworth Technology, Beta House, Chilworth Research Centre, Southampton SO176 7NS, no date.

Vahid Ebadat, James C. Mulligan, Robert J. Pappas, Sampuran Singh, "Experimental Research on Static Protective Flexible Intermediate Bulk Containers," Prepared for presentation at the IBC Conference "Process Safety—The European Dimension," Nov. 16 & 17, 1994.

Linq Industrial Fabrics, "New Generation of Static Protective Fabrics for FIBC Packaging," no date.

Dr. Vahid Ebadat, "Towards a "Safe" FIBC," Chilworth Technology, Inc., Princeton Corporate Plaza, New Jersey, no date.

K. Ikezaki, K. Iritani, T. Nakamura, T. Hori, "Charge stability of TPX film electrets," *Journal of Electrostatics*, 35 (1995), pp. 41–46, Elsevier Science B.V.

Mark N. Horenstein, "Surface Charging Limit for a Woven Fabric on a Ground Plane," *Journal of Electrostatics*, 35 (1995), pp. 31–40, Elsevier Science B.V.

Mark N. Horenstein, "Measuring isolated Surface Charge with a Noncontacting Voltmeter," *Journal of Electrostatics*, 35 (1995), pp. 203–213, Elsevier Science B.V.

"Nega–Stat the New Standard in Static Dissipative Fibers," Dupont (pp. 2–18), dated Feb. 28, 1994.

"The Effectiveness of Static Dissipative Fibers and Fabrics," DuPont NEGA–STAT® Marketing Video, Copyright 1993.

"Static Electricity and FIBCs," Exxon publication BBS–1191–A and Baxon® Blue Exxon publication BBP–1191–A, Oct. 1, 1991.

Barnhart, Clarence L. (editor). Definition of "corona." *The American College Standard Reference Dictionary*, p. 271. Chicago: American Peoples Press, Inc., 1963.

Parker, Sybil P. (editor). Definition of "corona discharge." *McGraw–Hill Dictionary of Scientific and Technical Terms* (Fifth Edition), p. 465. New York: McGraw–Hill, Inc., 1994.

Ebadat, V., and P. Cartwright. "Electrostatic Hazards in the Use of Flexible Intermediate Bulk Containers." Icheme Symposium Series No. 124, pp. 105–117.

\* cited by examiner

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1 and 7 are determined to be patentable as amended.

Claims 2–6 and 8–10, dependent on an amended claim, are determined to be patentable.

1. An ungrounded type flexible fabric container with a reduced potential for incendiary discharge *suitable* for use in a combustible environment *with a minimum ignition energy of 0.25 mJ*, comprising:
    a woven fabric configured to form the flexible fabric container having side walls;
    a coating of a compound having antistatic properties applied to cover a surface of said walls; and
    said coated fabric including a plurality of quasi-conductive fibers having corona discharge points, said fibers being composed of a plurality of filaments, said filaments sized and shaped to effect: corona discharge at said *corona* discharge points [and to have] *while having* resistance to avoid incendiary discharge at ends of said filaments and along the lengths of said filaments at a rate that results in incendiary type discharges in the combustible environment *of 0.25 mJ*.

7. An ungrounded type flexible fabric container with a reduced potential for incendiary discharge *suitable* for use in a combustible environment *with a minimum ignition energy of 0.25 mJ*, comprising:
    a woven fabric configured to form the flexible fabric container having side walls; and
    said woven fabric including at least one quasi-conductive fiber positioned up to about four inches apart from one another and having corona discharge points, said fibers being composed of one or more filaments, said filaments sized and shaped to effect corona discharge at said *corona* discharge points [and to have] *while having* resistance to avoid incendiary discharge at ends of said filaments and along lengths of said filaments at a rate that results in incendiary type discharges in the combustible environment *of 0.25 mJ*.

* * * * *